June 4, 1968  F. H. BEVAN  3,387,302

INDICATORS

Filed Feb. 6, 1967  2 Sheets-Sheet 1

INVENTOR
FRANK HENRY BEVAN
BY
ATTORNEY

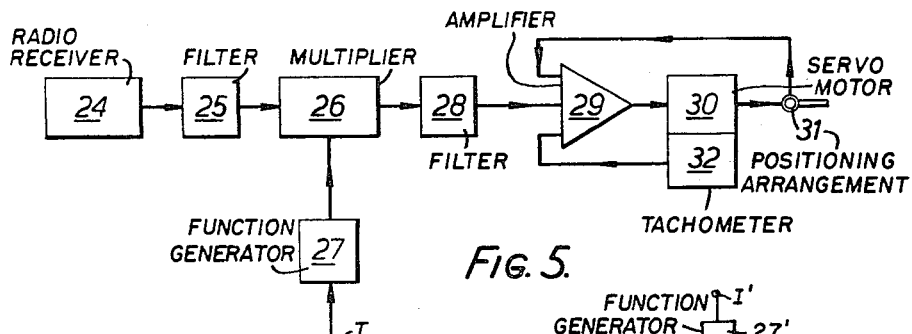
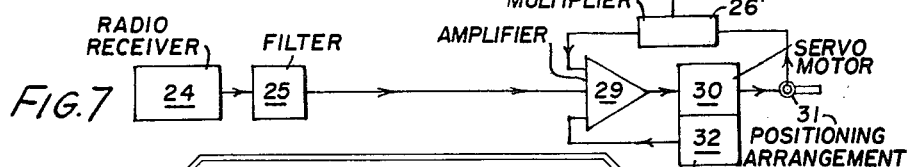
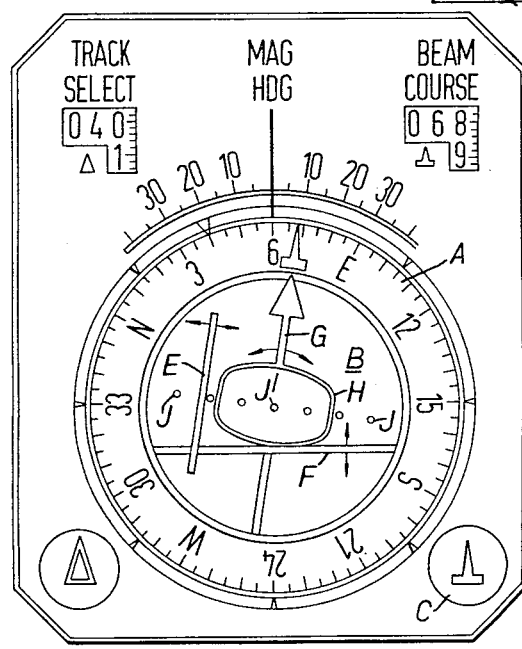
FIG. 6.

United States Patent Office 3,387,302
Patented June 4, 1968

3,387,302
INDICATORS
Frank H. Bevan, London, England, assignor to Elliott Brothers (London) Limited, London, England, a British company
Filed Feb. 6, 1967, Ser. No. 614,107
Claims priority, application Great Britain, Feb. 12, 1966, 6,295/66
11 Claims. (Cl. 343—108)

ABSTRACT OF THE DISCLOSURE

A landing flight path indicator system for an aircraft has receivers responsive to a radio guidance beam for providing signals indicative of the relationship between the actual aircraft position and a desired path.

The system includes a variable sensitivity indicator having a marker movable with respect to a fixed point to indicate the position of the aircraft with respect to the desired path and means for increasing the sensitivity as the aircraft approaches touchdown.

---

The invention relates to indicators.

The present invention provides an indicator system having an indicator for providing a display representative of the actual position of an aircraft with respect to a required flight path during landing and means for causing the indicator to become more sensitive as landing proceeds, to received signals from which the positional information is derived.

Said means may be such as to cause the indicator to become progressively more sensitive as the height of the aircraft decreases.

The indicator may have a display in the form of a horizontal movable strip and a vertical movable strip, the cross-over point of the strips denoting the position of the aircraft relative to a required position e.g. the centre of the display. Alternatively the display may take the form of a movable bug capable of being positioned in accordance with the actual position of the aircraft relative to a central required position.

The display of the indicator may include two or more fixed contrasting display areas, a central area denoting satisfactory positioning of the aircraft and one or more constrasting peripheral areas denoting unsatisfactory positioning of the aircraft.

The present invention further provides an indicator system having an indicator for providing a display representative of the actual position of an aircraft with respect to a required flight path, said display having a central fixed area denoting the required position and at least one contrasting peripheral area denoting excess of a predetermined deviation from the required position and a marker arrangement movable to indicate the actual position of the aircraft relative to the required position.

The present invention still further provides apparatus for controlling the moving portion of a display which is indicative of the actual position of a dirigible craft with respect to a required position including means operable so as to vary a position signal controlling said moving portion and representative of the actual position of said craft, that the sensitivity of the display is variable.

Said means may comprise a multiplier arranged to receive said signal, the multiplier being controlled by a signal from a function generator which, in turn, is controlled from means responsive, for example, to height of the craft or distance of the craft from a predetermined point.

Said means may alternatively be connected in the feedback circuit of a servo arrangement which controls the position of the moving portion of the display.

Two sets of apparatus, as defined in any of the next preceding three paragraphs, may be provided to control the moving portion of the display of the indicator, one set of apparatus being responsive to a localiser radio beam receiver and the other set of apparatus being responsive to a glide slope radio beam receiver.

The foregoing and further features of the invention will become apparent from the following description of some preferred embodiments thereof with reference to the accompanying drawings, in which:

FIGURE 5 is a block schematic representation of an arrangement for controlling the display of the indicators of FIGURES 2, 3 and 4, FIGURE 6 shows the face, of an indicator for use in a practical embodiment; and FIGURE 7 shows a modification of FIGURE 5.

Figure 1:
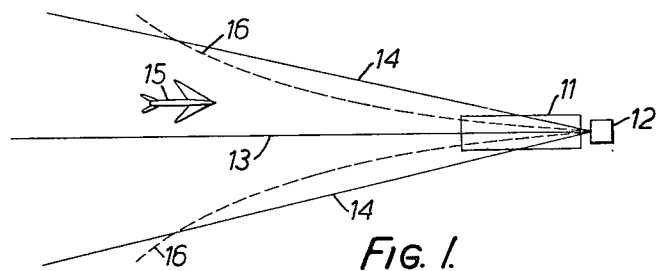
FIGURE 1 shows diagrammatically a runway, a localiser beam and an aircraft approaching to land.

Referring firstly to FIGURE 1 there is shown diagrammatically a runway 11 having a localiser radio beam transmitter 12 positioned at one end thereof. The localiser beam transmitter 12 transmits a beam which denotes the centre line 13 of the runway 11 and has polar coordinates 14 (two only shown). An aircraft 15 is shown approaching the runway 11 prior to landing. The dotted lines 16 denote a predetermined manoeuvre boundary within which the aircraft should ideally remain during approach and landing. The manoeuvre boundary is related to localiser beam angle as a function of range or alternatively height.

The localiser beam allows apparatus in the aircraft to determine the aircraft's position in azimuth width respect to the runway centre line. A further glide slope beam (not shown) is also provided at an angle of about 3° from the runway to allow the apparatus in the aircraft to determine positional signals with respect to pitch of the aircraft. A manoeuvre boundary is also provided for the glide slope beam and hence a composite manoeuvre boundary can be envisaged which would be somewhat funnel shaped when considered three dimensionally.

Figure 2:
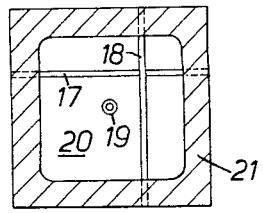
FIGURE 2 shows the display of one form of indicator indicating the position of the aircraft of FIGURE 1.

Referring now to FIGURE 2 there is shown the display of an indicator in which a horizontal movable strip 17 represents the centre of the glide slope beams and a movable vertical strip 18 represents the centre of the localiser beam. A fixed reference 19 provided at the centre of the display represents the aircraft and as shown in FIG. 2 the aircraft is to the left and is below the required flight path. A centrally positioned clear area 20 of the display represents the predetermined manoeuvre boundary for the aircraft and a peripheral shaded area 21 represents points outside the predetermined manoeuvre boundary. Hence whilst the cross-over point of the strips 17 and 18 occurs in the clear area 20 the aircraft is within the predetermined manoeuvre boundary and when the cross-over point between the strips 17 and 18 occurs in the shaded area 21 the aircraft is outside the predetermined manoeuvre boundary.

The arrangements for controlling the movement of the strips 17 and 18 are such that the scale of the display is altered as the aircraft approaches to land. The relative positions of the cross-over point of the strips 17 and 18 and the bug 19 for the position of the aircraft 15 as shown in FIGURE 1 could for example represent that the aircraft is 30 feet to the left of the centre line of the localiser beam and 15 feet below the centre line of the glide slope beam. Now if the aircraft 15 is considered to be at the beginning of the runway 11 the display as shown in FIGURE 2 could represent for example that the aircraft is 10 feet to the left of the centre line of the localiser beams and 6 feet below the centre line of the glide slope beam.

Figure 3:
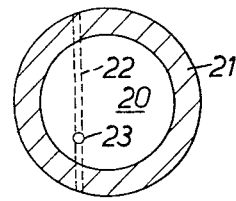
FIGURE 3 shows the display of a further form of indicator indicating the position of the aircraft of FIGURE 1.

Referring now to FIGURE 3 there is shown the display of an indicator having a member 22 which is movable to the left hand to the right as shown in FIGURE 3 and which carries a bug 23 which is movable upwardly and downwardly on the member 22 as shown in FIGURE 3. In this display arrangement the bug 23 represents the position of the aircraft, the centre line of the localiser beam is considered to be a vertical line passing through the centre of the display and the centre line of the glide slope beam is considered to be a horizontal line passing through the centre of the display. Hence it will be seen that the bug 23 again represents the fact that the aircraft 15 in FIGURE 1 is to the left and below the required flight path.

Figure 4:
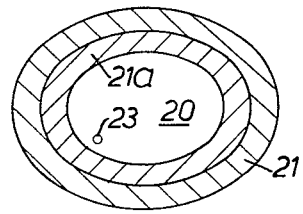
FIGURE 4 shows the display of a further form of indicator indicating the position of the aircraft of FIGURE 1.

Referring now to FIGURE 4 there is shown a display of an indicator similar to that shown in FIGURE 3 except that the display is elliptical instead of circular and a further manoeuvre boundary area 21a is also included. With this type of display the control of the positioning of the bug 23 can be scaled such that when the bug 23 is within the area 20 the aircraft is considered to be well positioned with respect to the required flight path, when the bug 23 is within the area 21a the position of the aircraft can be considered to be marginal and with the bug 23 positioned within the area 21 the position of the aircraft with respect to the required flight path can be considered unacceptable for continuing the landing manoeuvre.

Referring now to FIGURE 6 there is shown the face of display indicator for use in a practical embodiment of the invention. The instrument has an annular compass dial A and a central circular portion B which is set by rotation with respect to the dial A by a course select knob C. In addition there is a course or localiser marker bar E and a guide slope marker bar F.

The central portion B is marked or engraved with a course pointer G, a lozenge shaped "performance boundary" indicator H and a number of dots J spaced apart along a line normal to the course pointer G.

The intersection of the independently movable bars E and F represents the centre of the glide slope and localiser beam in space; the position of the central dot J' represents the position of the aircraft with respect to the point of intersection of the bars E and F.

The point of intersection of the bars E and F can be brought within the "performance boundary" marking H by manoeuvering the aircraft. Coincidence between the point of intersection and the dot J' indicates that the aircraft is on the optimum flight path i.e. the centre line of the glide slope and the localiser beam. The lozenge shaped "performance boundary" H defines the limit of satisfactory aircraft positioning during landing approach.

Referring now to FIGURE 5 there is shown a block schematic representation of an arrangement for controlling the movable parts of the indicators of FIGURES 2, 3, 4 or 6. The arrangement comprises a radio receiver 4 whose output is connected via a filter 25 to the input of a multiplier 26. The multiplication factor of the multiplier 26 is controlled by an input derived from the output of a function generator 27 which in turn derives an input from an input terminal I. The output of the multiplier 26 is connected via a filter 28 as one input of a summing amplifier 29. The output of summing amplifier 29 fed to control the operation of a servo motor 30 which controls the position of a positioning arrangement 31. A tachometer 32 connected to the servo motor 30 provides feedback input to the summing amplifier 29 and a further feedback circuit is provided from a pick-off on the positioning arrangement 31 to the summing amplifier 29.

In operation the transmitted localiser beam is received in the receiver 24 and a positional output signal therefrom is passed via the filter 25 to the input of a multiplier 26. A signal representative of the range of the aircraft from the runway, which could be derived from a radio altimeter, is connected to the input terminal I and fed to the input of the function generator 27. The output of the function generator is connected so as to control the multiplication factor of the multiplier 26. The function generator is arranged to be such that when the aircraft is near to or above the runway the multiplication factor of the multiplier 26 is considerably higher than that when the aircraft is remote from the runway. The output from the multiplier 26 is fed via the filter 28 to the summing amplifier 29 and hence the positional arrangement 31 is positioned according thereto by the servo motor 30. The positional arrangement 31 is arranged to control the position of the strip 18 in the indicator of FIGURE 2, the member 22 in the indicator of FIGURE 3 a similar member not shown in the indicator of FIGURE 4 or the localiser bar E in FIGURE 6. A further arrangement similar to that of FIGURE 6 but with the radio receiver 24 arranged to receive the glide slope beam is required to control the strip 17 of the indicator of FIGURE 2 the guide slope bar E of FIGURE 6 or the vertical movement of the bug 23 in the indicator of FIGURES 3 or 4.

An alternative arrangement (FIGURE 7) of the multiplier 26 and function generator 27 is shown referenced 26' and 27' respectively in the positional feedback circuit from the positioning arrangement 31.

It should be appreciated that the moving portions of the displays of the indicators could be positioned by arrangements which have normal galvanometer type meter movement operation in place of the servo arrangements.

I claim:

1. In a landing flight path indicator system for an aircraft having means responsive to a guidance beam to generate signals indicative of the relationship between the actual position of the aircraft and a desired position, the novel combination comprising,
   first display means representative of the desired position
   second display means movable relative to the first display means to indicate the relationship between said actual position and desired position,
   variable sensitivity actuating means responsive to said signals to move said second display means and
   means for progressively increasing the sensitivity of the actuating means in response to progress of the aircraft towards touchdown.

2. A system according to claim 1 wherein said sensitivity increasing means includes
   aircraft height responsive means.

3. A system according to claim 1 wherein said second display means includes
   a horizontal marker strip
   a vertical marker strip and
   means responsive to said variable sensitivity actuating means to position the cross-over point of the marker strips with respect to said first display means.

4. A system according to claim 1 wherein said first display means includes a member having
   a first portion representative of acceptable aircraft positioning and
   a second portion representative of undesirable aircraft positioning.

5. A system according to claim 4, in which
   the first portion is a central portion, and
   the second portion is a peripheral portion.

6. In position indicating apparatus for an aircraft the novel combination comprising
   signal producing means responsive to the position of the craft with respect to a required position
   a variable sensitivity position indicator including a movable marker arrangement and a fixed member representative of a required position, means moving said marker arrangement with respect to the fixed member in response to the position signal, and sensitivity control means for progressively increasing the sensitivity of the position indicator as the craft approaches a predetermined datum position.

7. Apparatus according to claim 6 wherein said variable sensitivity position indicator includes a multiplier controlling the position signal.

8. Apparatus according to claim 7 wherein said sensitivity control means comprises multiplier-control means responsive to the craft distance from a predetermined reference.

9. Apparatus according to claim 7 wherein said marker arrangement includes a servo system responsive to said signal feed back means in the servo-system providing a feedback signal and feed back signal controlling means responsive to the distance of the craft from a predetermined reference.

10. Apparatus according to claim 7 wherein said signal producing means includes a localiser beam receiver, and a glide slope radio beam receiver.

11. Apparatus according to claim 6 wherein said fixed member includes an on-course position-indicating central portion, and at least one off-course position-indicating peripheral portion.

References Cited

UNITED STATES PATENTS

| | | | |
|---|---|---|---|
| 2,419,970 | 5/1947 | Roe et al. | 343—117 |
| 2,439,044 | 4/1948 | Ferrill | 343—108 |
| 2,736,893 | 2/1956 | Munteuffel et al. | 343—108 |
| 2,926,294 | 2/1960 | Kerpchar | 343—108 |
| 3,034,032 | 5/1962 | McWilliams | 244—77 |
| 3,335,980 | 8/1967 | Doniger et al. | 244—77 |
| 1,999,047 | 4/1935 | Hahnemann | 343—108 |
| 2,051,966 | 8/1936 | Runge | 343—108 |
| 2,309,314 | 1/1943 | Harshaw | 343—108 |

RODNEY D. BENNETT, *Primary Examiner.*

H. C. WAMSLEY, *Assistant Examiner.*